US010773381B2

(12) United States Patent
Husain et al.

(10) Patent No.: US 10,773,381 B2
(45) Date of Patent: Sep. 15, 2020

(54) SECURE DISTRIBUTED SYSTEM USING BLOCKCHAIN FOR SELF-POLICING OF AUTONOMOUS AGENTS

(71) Applicant: SparkCognition, Inc., Austin, TX (US)

(72) Inventors: Syed Mohammad Amir Husain, Georgetown, TX (US); Syed Mohammad Ali, Austin, TX (US); Taylor Schmidt, Austin, TX (US)

(73) Assignee: SKYGRID, LLC, Austin, TX (US)

( * ) Notice: Subject to any disclaimer, the term of this patent is extended or adjusted under 35 U.S.C. 154(b) by 0 days.

(21) Appl. No.: 15/827,904

(22) Filed: Nov. 30, 2017

(65) Prior Publication Data

US 2019/0160660 A1     May 30, 2019

(51) Int. Cl.
     *B25J 9/16*           (2006.01)
     *H04L 9/06*          (2006.01)
     *G06F 16/22*        (2019.01)
     *H04L 9/32*          (2006.01)

(52) U.S. Cl.
     CPC ............. *B25J 9/163* (2013.01); *B25J 9/1674* (2013.01); *B25J 9/1694* (2013.01); *G06F 16/22* (2019.01); *H04L 9/0637* (2013.01); *H04L 9/3239* (2013.01); *H04L 9/0643* (2013.01); *H04L 2209/38* (2013.01)

(58) Field of Classification Search
     CPC ........ B25J 9/163; B25J 9/1694; B25J 9/1674; H04L 9/0637; H04L 9/0643; G06F 17/30312
     See application file for complete search history.

(56) References Cited

U.S. PATENT DOCUMENTS

| | | | | |
|---|---|---|---|---|
| 7,977,763 B2 * | 7/2011 | Lin | ..................... | H01L 21/6835 257/516 |
| 8,475,275 B2 * | 7/2013 | Weston | ................. | A63H 30/04 463/39 |
| 8,785,299 B2 * | 7/2014 | Mao | ........................ | H01L 23/48 257/678 |

(Continued)

OTHER PUBLICATIONS

Buchegger et al.; Self-Policing Mobile Ad-Hoc Networks by Reputation Systems; 2005; Retrieved from the Internet <URL: http://ieeexplore.ieee.org/abstract/document/1470831/>; pp. 1-7 as printed. (Year: 2005).*

(Continued)

*Primary Examiner* — Jarrett J Stark

(57) ABSTRACT

A device includes communication circuitry configured to receive a message indicating an observation of an agent device. The device further includes a processor coupled to the communication circuitry and a memory. The memory stores instructions that are executable by the processor to cause the processor to perform operations. The operations include accessing a blockchain data structure. The blockchain data structure includes one or more blocks including data descriptive of observations of a plurality of agent devices, where the plurality of agent devices including the agent device. The operations also include determining, based on one or more blocks of the blockchain data structure, a behavior of the agent device. The operations also include determine whether the behavior satisfies a behavior criterion associated with the agent device.

28 Claims, 7 Drawing Sheets

(56) References Cited

U.S. PATENT DOCUMENTS

| | | | | |
|---|---|---|---|---|
| 8,877,554 | B2* | 11/2014 | Tsai | H01L 23/49816 438/106 |
| 9,272,206 | B2* | 3/2016 | Weston | A63F 13/10 |
| 9,446,319 | B2* | 9/2016 | Barney | A63H 3/46 |
| 9,595,482 | B2* | 3/2017 | Chen | H01L 23/481 |
| 9,646,502 | B1* | 5/2017 | Gentry | G08G 5/0039 |
| 9,910,982 | B2* | 3/2018 | Chow | G06F 21/552 |
| 2002/0131397 | A1* | 9/2002 | Patel | H04W 48/10 370/349 |
| 2004/0166659 | A1* | 8/2004 | Lin | H01L 21/768 438/611 |
| 2009/0309212 | A1* | 12/2009 | Shim | H01L 21/568 257/700 |
| 2011/0121295 | A1* | 5/2011 | Kuan | H01L 22/34 257/48 |
| 2013/0168848 | A1* | 7/2013 | Lin | H01L 24/19 257/737 |
| 2014/0225222 | A1* | 8/2014 | Yu | H01L 27/1255 257/532 |
| 2014/0264930 | A1* | 9/2014 | Yu | H01L 24/19 257/774 |
| 2015/0306761 | A1* | 10/2015 | O'Connor | G06N 3/008 700/250 |
| 2015/0336270 | A1* | 11/2015 | Storr | B25J 9/1674 700/245 |
| 2016/0148887 | A1* | 5/2016 | Yu | H01L 23/5389 257/773 |
| 2017/0006417 | A1* | 1/2017 | Canoy | H04L 63/126 |
| 2017/0195747 | A1* | 7/2017 | Haberman | H04N 21/23424 |
| 2018/0113216 | A1* | 4/2018 | Kremer | G01S 17/89 |
| 2018/0122237 | A1* | 5/2018 | Nascimento | G08G 1/096827 |
| 2018/0270244 | A1 | 9/2018 | Kumar et al. | |
| 2018/0299882 | A1* | 10/2018 | Kichkaylo | G05D 1/0027 |
| 2018/0342036 | A1* | 11/2018 | Zachary | G06Q 30/0265 |
| 2019/0020844 | A1* | 1/2019 | Teixeira | G09B 7/02 |
| 2019/0049966 | A1* | 2/2019 | Poornachandran | G01C 21/005 |
| 2019/0206090 | A1* | 7/2019 | Ray | G06F 12/023 |

OTHER PUBLICATIONS vol. 24, Issuel 1-12 Journal of Field Robotics Special Issue: Special Issue on Teamwork in Field Robotics, Nov.-Dec. 2007, pp. 991-1014.*

ITEA Journal 2009; 30: 401-408 Copyright ' 2009 by the International Test and Evaluation Association.*

Lethal autonomous weapon [LAWs]. (16, Jan. 27). Retrieved Feb. 4, 2019, from https://en.wikipedia.org/w/index.php?title=Lethal_autonomous_weapon&oldid=701966936 (Year: 2016).*

Palm et al. (2016) Navigation in human-robot and robot-robot interaction using optimization methods. In: 2016 IEEE international conference on systems, man, and cybernetics (SMC), pp. 004489-004494 (Year: 2016).*

Soft robot tentacle can lasso an ant without harming it. (Jun. 11, 2015). Retrieved May 15, 2019, from Https://www.newscientist.corn/article/dn27704-soft-robot-tentacle-can-lasso-an-ant-without-harming-it/ (Year: 2015).*

Internantional Goverance of Autonomous Military Robots, 12 Columbia Science and Technology Law Review 272 (2011) (Published Jun. 2, 2011 (Year: 2001).*

* cited by examiner

Observation Report Management

Response to Non-conforming Behavior

SECURE DISTRIBUTED SYSTEM USING BLOCKCHAIN FOR SELF-POLICING OF AUTONOMOUS AGENTS

BACKGROUND

In fiction, the behavior of autonomous robots is often governed by some variant of the so called "Three Laws of Robotics," also called Asimov's Laws. For example, in such fictional accounts, a robot's basic programming may limit actions available to the robot based on whether such actions are likely to result in harm to a person. In some such fictional accounts, interpretation of the laws or larger implications of the laws are used as a plot element. For example, a robot may behave in manner that complies with the literal requirements of laws but that results in significant unintended consequences. Thus, the laws are obeyed, but the result is undesirable.

To date, robots have not achieved enough self-direction that simple over-arching rules, such as the Three Laws of Robotics, can be relied upon to govern their actions. Further, a more fundamental concern with allowing an individual robot or another autonomous agent device to police its own behavior is that the robot or autonomous agent device can be compromised in a manner that enables it to deviate from rules governing its behavior. As a simple example, a robot could be hacked in a manner that causes it to deviate from expected behavior. As another example, the robot's sensors could be fooled (e.g., by a faked global positioning system signal) in a manner that causes it to deviate from expected behavior. In either of these examples, the robot may perform actions specified by its code; however, the code has been altered or sensor data spoofed such that the robot nevertheless behaves in an unexpected and potentially harmful manner.

SUMMARY

The present application describes systems and methods that enable autonomous agent devices to police one another (i.e., "self-policing" among a group of autonomous agent devices). In the self-policing systems and methods disclosed herein members of a group of autonomous agent devices observe and evaluate each other's behavior. A self-policing group of autonomous agent devices may include one or more general-purpose robots (e.g., home assistance devices), one or more task-specific robots (e.g., manufacturing devices), one or more self-driving vehicles (e.g., self-driving cars, trucks, trains, ships, aircraft, etc.), or other autonomous devices. Additionally, in some implementations, the self-policing group of autonomous agent devices may include one or more infrastructure devices, such as a speed sensor or other sensing device, which may or may not be an autonomous agent device.

In the self-policing systems and methods disclosed herein, if a particular autonomous agent device deviates from an expected behavioral norm, other autonomous agent devices take action to limit or reduce the negative consequences of the particular autonomous agent device's actions. For example, the other autonomous agent devices may physically restrain or physically constrain the particular autonomous agent device. As another example, the other autonomous agent devices may override control of the particular autonomous agent device. Thus, regardless of the cause of the autonomous agent device's deviation from expected behavior, the consequences of the deviation are limited.

The self-policing systems disclosed herein use distributed decision-making and evaluation. Thus, there is no single master device that could be tampered with to defeat the self-policing system. Additionally, the behavior of the various autonomous agent devices is determined based on a tamper-evident public ledger (using a blockchain data structure) such that a record of the behavior of individual autonomous agent devices cannot be readily spoofed, obscured, or modified. Accordingly, the systems and methods described herein overcome concerns regarding autonomous agents being tampered with or otherwise deviating from expected behavior.

DETAILED DESCRIPTION

Figure 1:
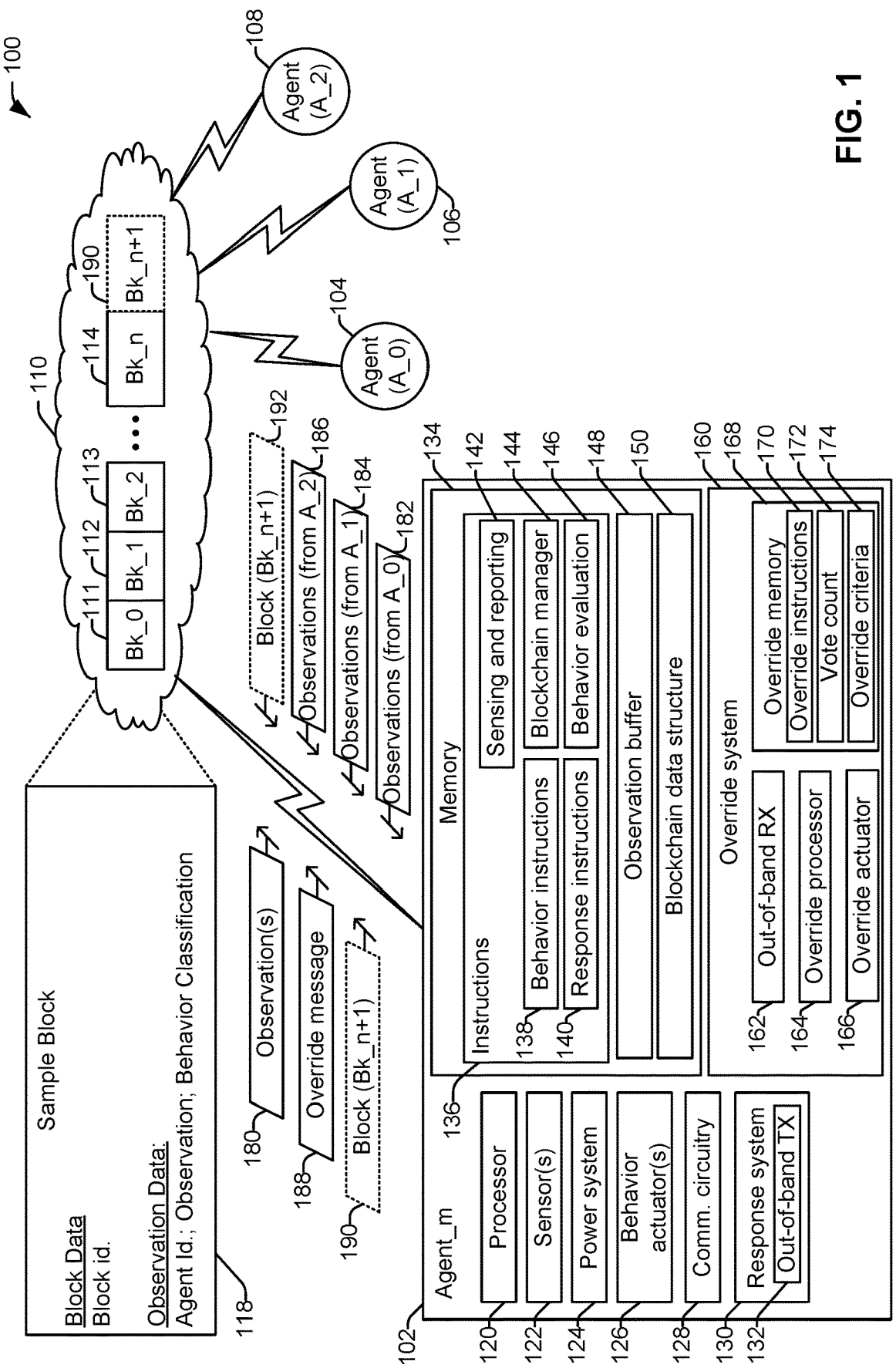
FIG. 1 illustrates a particular example of a system including a plurality of autonomous agent devices.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 illustrates a particular example of a system 100 including a plurality of agent devices 102-108. One or more of the agent devices 102-108 is an autonomous agent device. Unless otherwise clear from the context, the term "autonomous agent device" refers to both fully autonomous devices and semi-autonomous devices while such semi-autonomous devices are operating independently. A fully autonomous device is a device that operates as an independent agent, e.g., without external supervision or control. A semi-autonomous device is a device that operates at least part of the time as an independent agent, e.g., autonomously within some prescribed limits or autonomously but with supervision. An example of a semi-autonomous agent device is a self-driving vehicle in which a human driver is present to supervise operation of the vehicle and can take over control of the vehicle if desired. In this example, the self-driving vehicle may operate autonomously after the human driver initiates a self-driving system and may continue to operate autonomously until the human driver takes over control. As a contrast to this example, an example of a fully autonomous agent device is a fully self-driving car in which no driver is present (although passengers may be). For ease of reference, the terms "agent" and "agent device" are used herein as synonyms for the term "autonomous agent device" unless it is otherwise clear from the context.

As described further below, the agent devices 102-108 of FIG. 1 include hardware and software (e.g., instructions) to enable the agent devices 102-108 to police one another using distributed processing and a public, tamper-evident ledger. The public, tamper-evident ledger includes a blockchain of a shared blockchain data structure 110, instances of which are stored in local memory of each of the agent devices 102-108. For example, the agent device 102 includes the blockchain data structure 150, which is an instance of the shared blockchain data structure 110 stored in a memory 134 of the agent device 102. The blockchain is used by each of the agent devices 102-108 to monitor behavior of the other agent devices 102-108 and to respond to behavior deviations among the other agent devices 102-108, as described further below. As used herein, "the blockchain" refers to either to the shared blockchain data structure or to an instance of the shared blockchain data structure stored in a local memory, such as the blockchain data structure 150.

Although FIG. 1 illustrates four agent devices 102-108, the system 100 may include more than four agent devices or fewer than four agent devices. Further, the number and makeup of the agent devices may change from time to time. For example, a particular agent device (e.g., the agent device 106) may join the system 100 after the other agent device 102, 104, 108 have begun policing one another. To illustrate, after the agent devices 102, 104, 108 have formed a self-policing group, the agent device 106 may be added to the self-policing group, e.g., in response to the agent device 106 being placed in an autonomous mode after having operated in a controlled mode or after being tasked to autonomously perform an action. When joining a self-policing group, the agent device 106 may exchange public keys with other members of the group using a secure key exchange process. Likewise, a particular agent device (e.g., the agent device 108) may leave the self-policing group of the system 100. To illustrate, the agent device 108 may leave the self-policing group when the agent device leaves an autonomous mode in response to a user input. In this illustrative example, the agent device 108 may rejoin the self-policing group or may join another self-policing group upon returning to the autonomous mode.

In some implementations, the agent devices 102-108 include diverse types of devices. For example, the agent device 102 may differ in type and functionality (e.g., expected behavior) from the agent device 108. To illustrate, the agent device 102 may include an autonomous aircraft, and the agent device 108 may include an infrastructure device at an airport. Likewise, the other agent devices 104, 106 may be of the same type as one another or may be of different types. While only the features of the agent device 102 are shown in detail in FIG. 1, one or more of the other agent devices 104-108 may include the same features, or at least a subset of the features, described with reference to the agent device 102. For example, as described further below, the agent device 102 generally includes sub-systems to enable communication with other agent devices, sub-systems to enable the agent device 102 to perform desired behaviors (e.g., operations that are the main purpose or activity of the agent device 102), sub-systems for performing self-policing, and sub-systems to enable a self-policing group to override the agent device 102. The other agent devices 104-108 also include these sub-systems, except that in some implementations, a trusted infrastructure agent device may not include a sub-system to enable the self-policing group to override the trusted infrastructure agent device.

In FIG. 1, the agent device 102 includes a processor 120 coupled to communication circuitry 128, the memory 134, one or more sensors 122, one or more behavior actuators 126, and a power system 124. The communication circuitry 128 includes a transmitter and a receiver or a combination thereof (e.g., a transceiver). In a particular implementation, the communication circuitry 128 (or the processor 120) is configured to encrypt an outgoing message using a private key associated with the agent device 102 and to decrypt an incoming message using a public key of an agent device that sent the incoming message. Thus, in this implementation, communications between the agent devices 102-108 are secure and trustworthy (e.g., authenticated).

The sensors 122 can include a wide variety of types of sensors configured to sense an environment around the agent device 102. The sensors 122 can include active sensors that transmit a signal (e.g., an optical, acoustic, or electromagnetic signal) and generate sensed data based on a return signal, passive sensors that generate sensed data based on signals from other devices (e.g., other agent devices, etc.) or based on environmental changes, or a combination thereof. Generally, the sensors 122 can include any combination of or set of sensors that enable the agent device 102 to perform its core functionality and that further enable the agent device 102 to detect the presence of other agent devices 104-108 in proximity to the agent device 102. In some implementations, the sensors 122 further enable the agent device 102 to determine an action that is being performed by an agent device that is detected in proximity to the agent device 102. In this implementation, the specific type or types of the sensors 122 can be selected based on actions that are to be detected. For example, if the agent device 102 is to determine whether one of the other agent devices 104-108 is firing a weapon, the agent device 102 may include an acoustic sensor that is capable of isolating sounds associated with firing the weapon. Alternatively, or in addition, the agent device 102 may include an optical sensor that is capable of detecting a projectile fired by the weapon or capable of detecting movement associated with discharge of the weapon.

The behavior actuators 126 include any combination of actuators (and associated linkages, joints, etc.) that enable the agent device 102 to perform its core functions. The behavior actuators 126 can include one or more electrical actuators, one or more magnetic actuators, one or more hydraulic actuators, one or more pneumatic actuators, one or more other actuators, or a combination thereof. The specific arrangement and type of behavior actuators 126 depends on the core functionality of the agent device 102. For example, if the agent device 102 is an aircraft (e.g., an unmanned combat aerial vehicle (UCAV)), the behavior actuators 126 may include one or more flight control actuators, one or more thrust actuators, one or more weapons actuators, etc. In another example, if the agent device 102 is a household cleaning robot, the behavior actuators 126 may include one or more movement actuators, one or more cleaning actuators, etc. Thus, the complexity and types of the behavioral actuators 126 can vary greatly from agent device to agent device depending on the purpose or core functions of each agent device.

The processor 120 is configured to execute instructions 136 from the memory 134 to perform various operations. For example, the instructions 136 include behavior instructions 138 which include programming or code that enables the agent device 102 to perform processing associated with one or more useful functions of the agent device 102. To illustrate, the behavior instructions 138 may include artificial intelligence instructions that enable the agent device 102 to autonomously (or semi-autonomously) determine a set of actions to perform. The behavior instructions 138 are executed by the processor 120 to perform core functionality of the agent device 102 (e.g., to perform the main task or tasks for which the agent device 102 was designed or programmed). As a specific example, if the agent device 102 is a self-driving vehicle, the behavior instructions 138 include instructions for controlling the vehicle's speed, steering the vehicle, processing sensor data to identify hazards, avoiding hazards, and so forth.

The instructions 136 also include blockchain manager instructions 144. The blockchain manager instructions 144 are configured to generate and maintain the blockchain. As explained above, the blockchain data structure 150 is an instance of, or an instance of at least a portion of, the shared blockchain data structure 110. The shared blockchain data structure 110 is shared in a distributed manner across a plurality of the agent devices 102-108 or across all of the agent devices 102-108. In a particular implementation, each of the agent devices 102-108 stores an instance of the shared blockchain data structure 110 in local memory of the respective agent device. In other implementations, each of the agent devices 102-108 stores a portion of the shared blockchain data structure 110 and each portion is replicated across multiple of the agent devices 102-108 in a manner that maintains security of the shared blockchain data structure 110 public (i.e., available to other agent devices) and incorruptible (or tamper evident) ledger.

The shared blockchain data structure 110 stores, among other things, data determined based on observation reports from the agent devices 102-108. An observation report for a particular time period includes data descriptive of a sensed environment around one of the agent devices 102-108 during the particular time period. To illustrate, when a first agent device senses the presences of or actions of a second agent device, the first agent device may generate an observation include data reporting the location and/or actions of the second agent and may include the observation (possibly with one or more other observations) in an observation report. Each agent device 102-108 sends its observation reports to the other agent devices 102-108. For example, the agent device 102 may broadcast an observation report 180 to the other agent device 104-108. In another example, the agent device 102 may transmit an observation report 180 to another agent device (e.g., the agent device 104) and the other agent device may forward the observation report 180 using a message forwarding functionality or a mesh networking communication functionality. Likewise, the other agent devices 104-108 transmit observation reports 182-186 that are received by the agent device 102.

The observation reports 180-186 are used to generate blocks of the shared blockchain data structure 110. For example, FIG. 1 illustrates a sample block 118 of the shared blockchain data structure 110. The sample block 118 illustrated in FIG. 1 includes a block data and observation data.

The block data of each block includes information that identifies the block (e.g., a block id.) and enables the agent devices 102-108 to confirm the integrity of the blockchain of the shared blockchain data structure 110. For example, the block id. of the sample block 118 may include or correspond to a result of a hash function (e.g., a SHA256 hash function, a RIPEMD hash function, etc.) based on the observation data in the sample block 118 and based on a block id. from the prior block of the blockchain. For example, in FIG. 1, the shared blockchain data structure 110 includes an initial block (Bk_0) 111, and several subsequent blocks, including a block Bk_1 112, a block Bk_2 113, and a block Bk_n 114. The initial block Bk_0 111 includes an initial set of observation data and a hash value based on the initial set of observation data. The block Bk_1 112 includes observation data based on observation reports for a first time period that is subsequent to a time when the initial observation data were generated. The block Bk_1 112 also includes a hash value based on the observation data of the block Bk_1 112 and the hash value from the initial block Bk_0 111. Similarly, the block Bk_2 113 includes observation data based on observation reports for a second time period that is subsequent to the first time period and includes a hash value based on the observation data of the block Bk_2 113 and the hash value from the block Bk_1 112. The block Bk_n 114 includes observation data based on observation reports for a later time period that is subsequent to the second time period and includes a hash value based on the observation data of the block Bk_n 114 and the hash value from the immediately prior block (e.g., a block Bk_n−1). This chained arrangement of hash values enables each block to be validated with respect to the entire blockchain; thus, tampering with or modifying values in any block of the blockchain is evident by calculating and verifying the hash value of the final block in the block chain. Accordingly, the blockchain acts as a tamper-evident public ledger of observation data from members of the self-policing group.

Each of the observation reports 180-186 may include a self-reported location and/or action of the agent device that send the observation report, a sensed location and/or action of another agent device, sensed locations and/or observations or several other agent devices, or a combination thereof. For example, the processor 120 of the agent device 102 may execute sensing and reporting instructions 142, which cause the agent device 102 sense its environment using the sensors 122. While sensing, the agent device 102 may detect the location of a nearby agent device, such as the agent device 104. At the end of the particular time period or based on detecting the agent device 104, the agent device 102 generates the observation report 180 reporting the detection of the agent device 104. In this example, the observation report 180 may include self-reporting information, such as information to indicate where the agent device 102 was during the particular time period and what the agent device 102 was doing. Additionally, or in the alternative, the observation report 180 may indicate where the agent device 104 was detected and what the agent device 104 was doing. In this example, the agent device 102 transmits the observation report 180 and the other agent devices 104-108 send their respective observation reports 182-186, and data from the observations reports 180-186 is stored in observation buffers (e.g., the observation buffer 148) of each agent device 102-108.

In some implementations, the blockchain manager instructions 142 are configured to determine whether an observation in the observation buffer 148 is confirmed by one or more other observations. For example, after the observation report 182 is received from the agent device 104, data from the observation report 182 (e.g., one or more observations) are stored in the observation buffer 148. Subsequently, the sensors 122 of the agent device 102 may generate sensed data that confirms the data. Alternatively, or in addition, another of the agent devices 106-108 may send an observation report 184, 186 that confirms the data. In this example, the blockchain manager instructions 142 may indicate that the data from the observation report 182 stored in the observation buffer 148 is confirmed. For example, the blockchain manager instructions 142 may mark or tag the data as confirmed (e.g., using a confirmed bit, a pointer, or a counter indicating a number of confirmations). As another example, the blockchain manager instructions 142 may move the data to a location of the memory 134 of the observation buffer 148 that is associated with confirmed observations. In some implementations, data that is not confirmed is eventually removed from the observation buffer 148. For example, each observation or each observation report 180-186 may be associated with a time stamp, and the blockchain manager instructions 142 may remove an observation from the observation buffer 148 if the observation is not confirmed within a particular time period following the time stamp. As another example, the blockchain manager instructions 142 may remove an observation from the observation buffer 148 if at least one block that includes observations within a time period correspond to the time stamp has been added to the blockchain.

The blockchain manager instructions 142 are also configured to determine when a block forming trigger satisfies a block forming condition. The block forming trigger may include or correspond to a count of observations in the observation buffer 148, a count of confirmed observations in the observation buffer 148, a count of observation reports received since the last block was added to the blockchain, a time interval since the last block was added to the blockchain, another criterion, or a combination thereof. If the block forming trigger corresponds to a count (e.g., of observations, of confirmed observations, or of observation reports), the block forming condition corresponds to a threshold value for the count, which may be based on a number agent devices in the self-policing group. For example, the threshold value may correspond to a simple majority of the agent devices in the self-policing group or to a specified fraction of the agent devices in the self-policing group.

In a particular implementation, when the block forming condition is satisfied, the blockchain manager instructions 144 form a block using confirmed data from the observation buffer 148. The blockchain manager instructions 144 then cause the block to be transmitted to the other agent devices, e.g., as block Bk_n+1 190 in FIG. 1. Since each of the agent devices 102-108 attempts to form a block when its respective block forming condition is satisfied, and since the block forming conditions may be satisfied at different times, block conflicts can arise. A block conflict refers to a circumstance in which a first agent (e.g., the agent device 102) forms and sends a first block (e.g., the Bk_n+1 190), and simultaneously or nearly simultaneously, a second agent device (e.g., the agent device 104) forms and sends a second block (e.g., a block Bk_n+1 192) that is different than the first block. In this circumstance, some agent devices receive the first block before the second block while other agent devices receive the second block before the first block. In this circumstance, the blockchain manager instructions 144 may provisionally add both the first block and the second block to the blockchain, causing the blockchain to branch. The branching is resolved when the next block is added to the end of one of the branches such that one branch is longer than the other (or others). In this circumstance, the longest branch is designated as the main branch. When the longest branch is selected, any observations that are in block corresponding to a shorter branch and that are not accounted for in the longest branch are returned to the observation buffer 148.

The memory 134 also includes behavior evaluation instructions 146, which are executable by the processor 120 to determine a behavior of another agent and to determine whether the behavior conforms to a behavior criterion associated with the other agent device. The behavior can be determined based on observation data from the blockchain, from confirmed observations in the observation buffer 148, or a combination thereof. Some behaviors may be determined based on a single confirmed observation. For example, if an agent device is observed carrying cargo and the observation is confirmed, the confirmed observation that the agent device was carrying cargo corresponds to the behavior "carrying cargo". Other behaviors may be determined based on two or more confirmed observations. For example, a first confirmed observation may indicate that the agent device is at a first location at a first time, and a second confirmed observation may indicate that the agent device is at a second location at a second time. These two confirmed observations can be used to determine a behavior indicating an average direction (i.e., from the first location toward the second location) and an average speed of movement of the agent device (based on the first time, the second time, and a distance between the first location and the second location).

The particular behavior or set of behaviors determined for each agent device may depend on behavior criteria associated with each agent device. For example, if behavior criteria associated with the agent device 104 specify a boundary beyond which the agent device 104 is not allowed to carry passengers, the behavior evaluation instructions 146 may evaluate each confirmed observation of the agent device 104 to determine whether the agent device 104 is performing a behavior corresponding to carrying passengers, and a location of the agent device 104 for each observation in which the agent device 104 is carrying passengers. In another example, a behavior criterion associated with the agent device 106 may specify that the agent device 106 should always move at a speed less than a speed limit value. In this example, the behavior evaluation instructions 146 do not determine whether the agent device 106 is performing the behavior corresponding to carrying passengers; however, the behavior evaluation instructions 146 may determine a behavior corresponding to an average speed of movement of the agent device 106. The behavior criteria for any particular agent device 102-108 may identify behaviors that are required (e.g., always stop at stop signs), behaviors that are prohibited (e.g., never exceed a speed limit), behaviors that are conditionally required (e.g., maintain an altitude of greater than 1000 meters while operating within 2 kilometers of a naval vessel), behaviors that are conditionally prohibited (e.g., never arm weapons while operating within 2 kilometers of a naval vessel), or a combination thereof. Based on the confirmed observations, each agent device 102-108 determines corresponding behavior of each other agent device based on the behavior criteria for the other agent device.

After determining a behavior for a particular agent device, the behavior evaluation instructions 146 compare the behavior to the corresponding behavior criterion to determine whether the particular agent device is conforming to the behavior criterion. In some implementations, the behavior criterion is satisfied if the behavior is allowed (e.g., is whitelisted), required, or conditionally required and the condition is satisfied. In other implementations, the behavior criterion is satisfied if the behavior is not disallowed (e.g., is not blacklisted), is not prohibited, is not conditionally prohibited and the condition is satisfied, or is conditionally prohibited but the condition is not satisfied.

In some implementations, the behavior criteria for each of the agent devices 102-108 are stored in the shared blockchain data structure 110. In other implementations, the behavior criteria for each of the agent devices 102-108 are stored in the memory of each agent devices 102-108. In other implementations, the behavior criteria are accessed from a trusted public source, such as a trusted repository, based on the identity or type of agent device associated with the behavior criteria. In yet another implementation, an agent device may transmit data indicating behavior criteria for the agent device to other agent devices of the self-policing group when the agent device joins the group. In this implementation, the data may include or be accompanied by information that enables the other agent devices to confirm the authenticity of the behavior criteria. For example, the data (or the behavior criteria) may be encrypted by a trusted source (e.g., using a private key of the trusted source) before being stored on the agent device. To illustrate, when the agent device 102 receives data indicating behavior criteria for the agent device 106, the agent device 102 can confirm that the behavior criteria came from the trusted source by decrypting the data using a public key associated with the trusted source. Thus, the agent device 106 is not able to transmit fake behavior criteria to avoid appropriate scrutiny of its behavior.

In some implementations, if a first agent device determines that a second agent device is not conforming with a behavior criterion associated with the second agent device, the first agent device may execute response instructions 140. The response instructions 140 are executable to initiate and perform a response action. For example, each agent device 102-108 may include a response system, such as a response system 130 of the agent device 102. The response system 130 is configured to initiate actions to stop the second agent device or to limit effects of the second agent device's non-conforming behavior. For example, the first agent device may attempt to secure, constrain, or confine the second agent device. To illustrate, in response to determining that the agent device 104 is not conforming with a behavior criterion associated with the agent device 104, the agent device 102 may activate the response system 130, which may cause the agent device 102 to move toward the agent device 104 to block a path of the agent device 104. Alternatively, or in addition, the response system 130 may include a restraint mechanism (e.g., a tether) that the agent device 102 can attach to the agent device 104 to stop or limit the non-conforming behavior of the agent device 104.

As another example, the first agent device may attempt to disable or override control of the second agent device. To illustrate, each of the agent devices 102-108 may include an override system, such as the override system 160 of the agent device 102. As explained further below, the override system 160 may override control of the behavior of the agent device 102 responsive to signals from the other agent devices 104-108. Alternatively, or in addition, the override system 160 may permanently or temporarily disable the agent device 102 responsive to signals from the other agent devices 104-108.

In an example in which the agent device 104 includes an override system, the response system 130 of the agent device 102 may include an out-of-band transmitter (TX) 132. In this context, "out-of-band" refers to using a different communication frequency than a communication frequency used by the communication circuitry 128, using a different communication protocol than a communication protocol used by the communication circuitry 128, otherwise communicating in a manner that is distinct from communications using the communication circuitry 128, or a combination thereof. A signal sent by the out-of-band transmitter 132 of the agent device 102 is received at an out-of-band receiver of the override system of the agent device 104. The out-of-band transmitter 132 is configured to send a signal (e.g., an override message 188) to the agent device 104 to cause the override system of the agent device 104 to be activated. If the override system of the agent device 104 receives at least a threshold number override messages from other agent devices, the override system will activate to stop the non-conforming behavior.

As shown in FIG. 1, the override system 160 of the agent device 102 is physically and/or logically isolated from the processor 120, the communication circuitry 128, the memory 134, the sensors 122, or a combination thereof.

Thus, tampering with the processor 120, the communication circuitry 128, the memory 134, and the sensors 122 does not affect the override system 160. In the example illustrated in FIG. 1, the override system 160 includes an out-of-band receiver (RX) 162, an override processor 164, an override memory 168, and an override actuator 166. In some implementations, the override processor 164 includes or corresponds to a general-purpose processor that executes instructions from the override memory 168. In other implementations, the override processor 164 includes or corresponds to a special purpose circuit, that is tamper-resistant, such as an application-specific integrated circuit (ASIC). Additionally, the override memory 168 may include or correspond to a tamper-resistant secure memory device.

The out-of-band receiver 162 is configured to receive override messages from other agent devices. The override processor 164 confirms that each override message was sent by a recognized agent device by decrypting the override message using a public key of the sending agent device. If the override message is from a recognized agent device, the override processor 164 increments a vote count 172 based on the override message. If the vote count satisfies override criteria 174, the override processor 164 executes override instructions 170. In some implementations, the override criteria 174 specify a simple count, such as a total number of authenticated override messages that have been received. In other implementations, the override criteria 174 also specify a time limit. For example, the override criteria 174 may be satisfied if a threshold number of override messages are received within a specified amount of time. The time limit may depend on the types of agent devices in the self-policing group, the number of agent devices in the self-policing group, a distribution of the agent devices in a network (e.g., a largest hop count across a mesh network of the agent devices), based on other criteria, or a combination thereof. In some implementations, the override criteria 174 specify that override messages be received from particular combinations of agent devices. For example, the override criteria may be satisfied if a first threshold number override messages are received from trusted infrastructure agent devices and a second threshold number override messages are received from other agent devices. Combinations of the above implementations may also be used. To illustrate, the override criteria 174 may be satisfied if override messages are received from a simple majority of agent devices of the self-policing group, and an override message is received from a trusted infrastructure device within a threshold time period from receipt of the first override message.

The override instructions 170 are executable by the override processor 164 to actuate the override actuator 166. The override actuator 166 is configured to place the agent device 102 in a safe condition, to impede or stop the agent device 102, or to temporarily or permanently disable the agent device 102. As an example of placing the agent device 102 in a safe condition, the override actuator 166 may include a switch (e.g., a transistor or an electrically actuated relay) that can be actuated to disconnect the behavior actuators 126 from control signals sent by the processor 120 and to connect the behavior actuators 126 to control signals sent by the override processor 164. In this example, override instructions 170 are executable by the override processor 164 to send control signals to the behavior actuators 126 to cause the agent device 102 to enter a safed condition. Entering the safed condition may include, for example, navigating to and landing or stopping at a safe location, placing weapons in a disarmed stated, disabling behavior actuators 126 that are not in use to enter the safe condition, etc. Generally, in this example, entering the safed condition temporarily disables the agent device 102 in a manner that may enable the agent device 102 to be recovered and manually reset.

In another example, the impeding or stopping the agent device 102 is similar to causing the agent device 102 to enter the safed condition, except that effects on the agent device 102 may be more immediate and severe, with less concern for allowing recovery of the agent device 102. To illustrate, to impede or stop the agent device 102, the override actuator 166 may disconnect the behavior actuators 126 from all control signals, from the power system 124, or both. In this illustrative example, the agent device 102 is effectively immediately shutdown, with no concern of reaching a safe location or stopping point. In another illustrative example, the override actuator 166 may disconnect the behavior actuators 126 from control signals sent by the processor 120 and to connect the connect the behavior actuators 126 to control signals sent by the override processor 164, and the override processor 164 may send control signals to the behavior actuators 126 that cause the agent device 102 to stop (e.g., by actuating a brake, deactivating a thrust generator, dumping a power source, etc.).

In yet another example, actuating the override actuator 166 may damage or destroy the agent device 102. To illustrate, when actuated, the override actuator 166 may cause a short in the power system 124 leading to catastrophic failure of the power system 124. In another illustrative example, the override actuator 166 may include an explosive charge that is detonated when the override actuator 166 is actuated. The explosive charge may be configured to damage or destroy at least a portion of the agent device 102.

In some implementations, the agent device 102 includes more than one override actuator 166, and the particular override actuator that is actuated depends on which override criterion is satisfied. For example, if a first set of agent devices send override messages, a first override actuator may be actuated, whereas if a second set of agent devices send override messages, a second override actuator may be actuated. In another example, each agent device 102-108 may be able to send different types of override messages. In this example, an agent device may send a first type of override message in response to detecting a behavior deviation that is consider minor (based on the behavior criteria) and may send a second type of override message in response to detecting a behavior deviation that is consider major (based on the behavior criteria). In this example, if the out-of-band receiver 162 of the agent device 102 receives a particular number of override messages of the first type, the override processor 164 activates a first override actuator. Further, if the out-of-band receiver 162 of the agent device 102 receives a particular number of override messages of the second type, the override processor 164 activates a second override actuator. In this example, the first override actuator may cause the agent device 102 to enter a safed condition, whereas the second override actuator may stop, damage, or destroy the agent device 102.

Thus, the system 100 enables multiple agent devices to police one another, such that even if one of the agent devices deviates from expected behavior (e.g., as a result of tampering or a malfunction), the other agent devices can limit harm caused by the agent device. If the behavior criteria and override criteria are selected appropriately, the system 100 can safely policy the multiple agent devices even if multiple of the agent devices deviate from expected behavior. For example, in some implementations, a hacker would need to affect (e.g., control or fool) more than half of the agent devices of a self-policing group in order to prevent other agent devices of the self-policing group from disabling or safing the affected agent devices.

Figure 2:
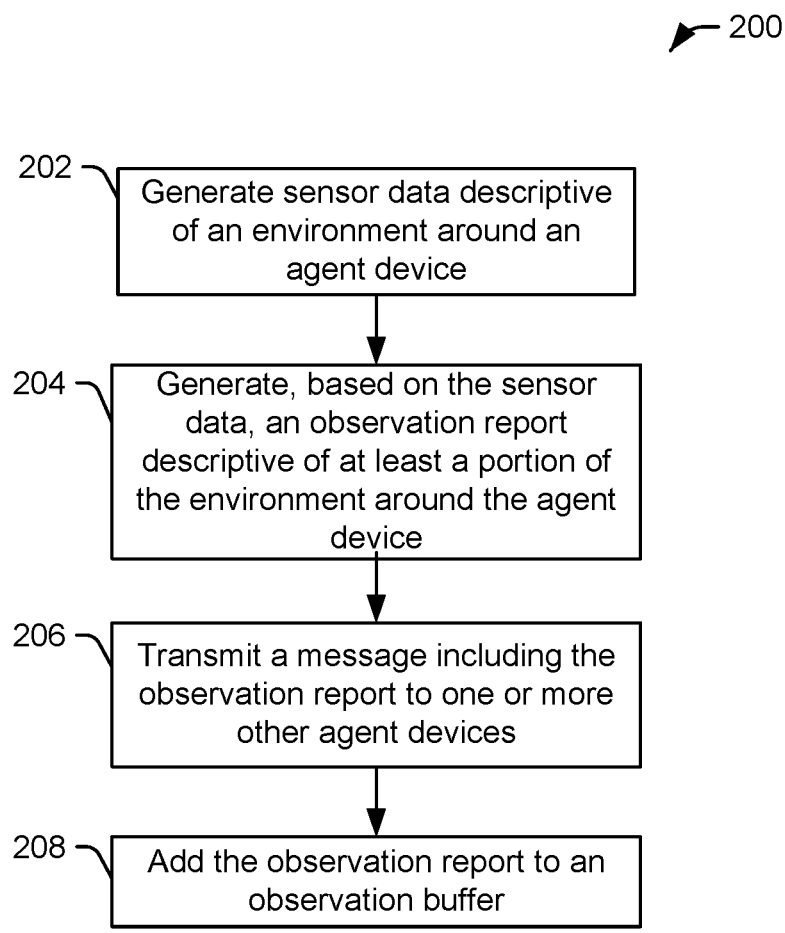
FIG. 2 illustrates a particular example of a method performed by one of the agent devices of FIG. 1 to sense and report an environment around the agent device.

FIG. 2 illustrates a particular example of a method 200 performed by one of the agent devices 102-108 of FIG. 1 to sense and report an environment around the agent device. For example, the method 200 may be performed by the processor 120 (in conjunction with the sensor 122) of the agent device 102 executing the sensing and reporting instructions 142.

The method 200 includes, at 202, generating sensor data descriptive of an environment around an agent device (e.g., the agent device performing the method 200). The type and content of the sensor data depends on the type of sensors employed by the agent device. As explained above, the sensors can include passive sensors, active sensors, or a combination thereof. The sensor data can describe an entire region around the agent device (e.g., independent of whether another agent device is detected) or can be focused on and describe regions in which other agent devices are detected. The sensor data can also include self-reporting information regarding the agent device performing the method 200. For example, the sensors can include position sensors (e.g., a global positioning system receiver), and the sensor data can indicate a location of the agent device based on the position sensors. As another example, the sensors can include operational state sensors associated with operation of the agent device, such as a flap position sensor, a speed sensor, etc. In this example, the self-reporting information may include sensor data from the operational state sensors.

The method 200 also includes, at 204, generating, based on the sensor data, an observation descriptive of at least a portion of the environment around the agent device. For example, the observation may indicate a location of the agent device performing the method 200 (i.e., a self-reported location of the agent device). As another example, the observation may indicate an activity of the agent device performing the method 200 (i.e., a self-reported activity of the agent device). In other examples, the observation may indicate a location of another agent device, an activity of the other agent device, or both. In some implementations, the observation may include self-reported information as well as information regarding locations and/or activities of other agent devices.

The method 200 also includes, at 206, transmitting a message (e.g., an observation report) including the observation to one or more other agent devices. For example, the message may be broadcast to all other agent devices of a self-policing group. In another example, the agent devices of the self-policing group use a mesh-network based communication protocol, in which case the message may be unicast or broadcast between agent devices and receiving a receiving agent device may forward the message to other agent devices. In a particular implementation, the message is encrypted using a private key of the agent device sending the message. In this implementation, other agent devices use a public key of the agent device to decrypt the message, thereby confirming that the agent device send the message. Thus, the encryption both prevents parties that are not part of the self-policing group from interpreting information within the message and provides message authentication within the self-policing group.

The method 200 also includes, at 208, adding the observation from the observation report to an observation buffer. Observations in the observation buffer may be used to form a block of the blockchain data structure 110, as described further below.

The method 200 or portions thereof may be performed periodically or continuously (e.g., in an iterative manner). For example, one or more of the sensors 122 may sense an environment around the agent device 102 continuously and generate sensor data continuously or periodically. As another example, one or more of the sensors 122 may sense an environment around the agent device 102 periodically and generate sensor data periodically. As yet another example, the sensors 122 may include at least one sensor that generates sensor data continuously and at least one other sensor that generates sensor data periodically or occasionally. An observation report can include a single observation (e.g., a location and action associated with a single agent device), or the observation report can include multiple observations (e.g., locations and actions associated with multiple agent device) gathered during a particular time period.

Figure 3:
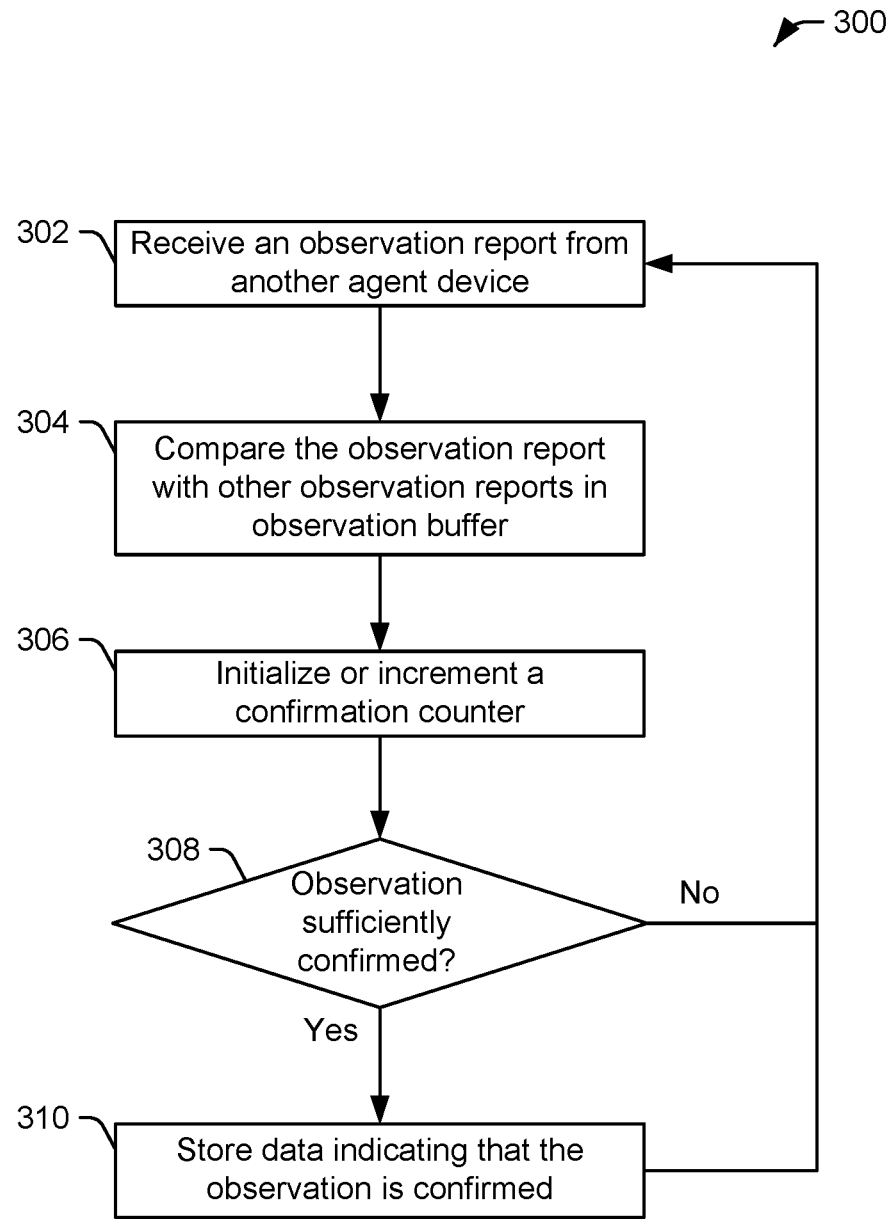
FIG. 3 illustrates a particular example of a method performed by one of the agent devices of FIG. 1 to manage observation reports from other agent devices.

FIG. 3 illustrates a particular example of a method 300 performed by one of the agent devices 102-108 of FIG. 1 to manage observation reports from other agent devices. For example, the method 300 may be performed by the processor 120 of the agent device 102 while executing the blockchain manager instructions 142.

The method 300 includes, at 302, receiving an observation report (including one or more observations) from another agent device. For example, the agent device 102 may receive one of the observation reports 182-186 from one or more of the other agent device 104-108.

The method 300 includes, at 304, comparing the observations from the observation report with other observations in the observation buffer to determine whether the observation is confirming a previous observation. The method 300 includes, at 306, initializing or incrementing an observation counter based on the observation. If the observation is an initial observation of its type (e.g., the first observation to report particular information), a new observation counter is initialized. For example, if comparing the observation does not match any observation in the observation buffer, based on the comparison at 304, a confirmation counter for the observation is initialized. However, if the observation matches (e.g., confirms) an observation in observation buffer, a confirmation counter associated with the observation is incremented to indicate an additional confirmation of the observation.

The method 300 also includes, at 306, determining whether an observation in the observation report is sufficiently confirmed. In a particular implementation, an observation is considered sufficiently confirmed if at least a threshold number of agent devices have provided observations that agree with the observation. In a simple example, an observation may be considered sufficiently confirmed if at least two agent devices agree on the observation. In some implementations, agreement regarding an observation does not need to be exact. For example, if two reported locations are within a threshold range of one another, the reported locations may be considered to be in agreement since some error is associated with location determination. Some other observations may need to be identical to be confirming. For example, if a first observation indicates that an agent device is carrying first cargo, and a second observation indicates that the agent device is instead carrying second cargo, the first and second observations may be considered to be in agreement if the behavior to be detect is whether the agent device is carrying cargo (e.g., any cargo); however, the first and second observations may be considered to be in disagreement if the behavior to be detect is whether the agent device is carrying specific cargo (e.g., the first cargo).

If the observation is not sufficiently confirmed, the method 300 returns to 302 to await receipt of another observation. If the observation is sufficiently confirmed, the method 300 includes, at 308, storing data indicating that the observation is confirmed. For example, the observation itself may be stored in a logical or physical memory location associated with confirmed observations. As another example, a bit, a pointer, or other data element may be stored to indicate that the observation is confirmed.

In some implementations, the method 300 may also include periodically or occasionally removing unconfirmed observations from the observation buffer. For example, if an observation in the observation buffer is not confirmed after a specified period of time or after a particular number of blocks have been added to the blockchain, the unconfirmed observation may be removed from the observation buffer. As another example, if a block that includes observations from a timeframe corresponding to or after a timeframe associated with the unconfirmed observation, data may be stored indicated that the unconfirmed observation is scheduled for deletion. In this example, after the unconfirmed observation is scheduled for deletion, if a threshold period of time passes or if a threshold number of additional blocks are added to the blockchain without receiving confirmation of the unconfirmed observation, the unconfirmed observation is removed from the observation buffer.

Figure 4:
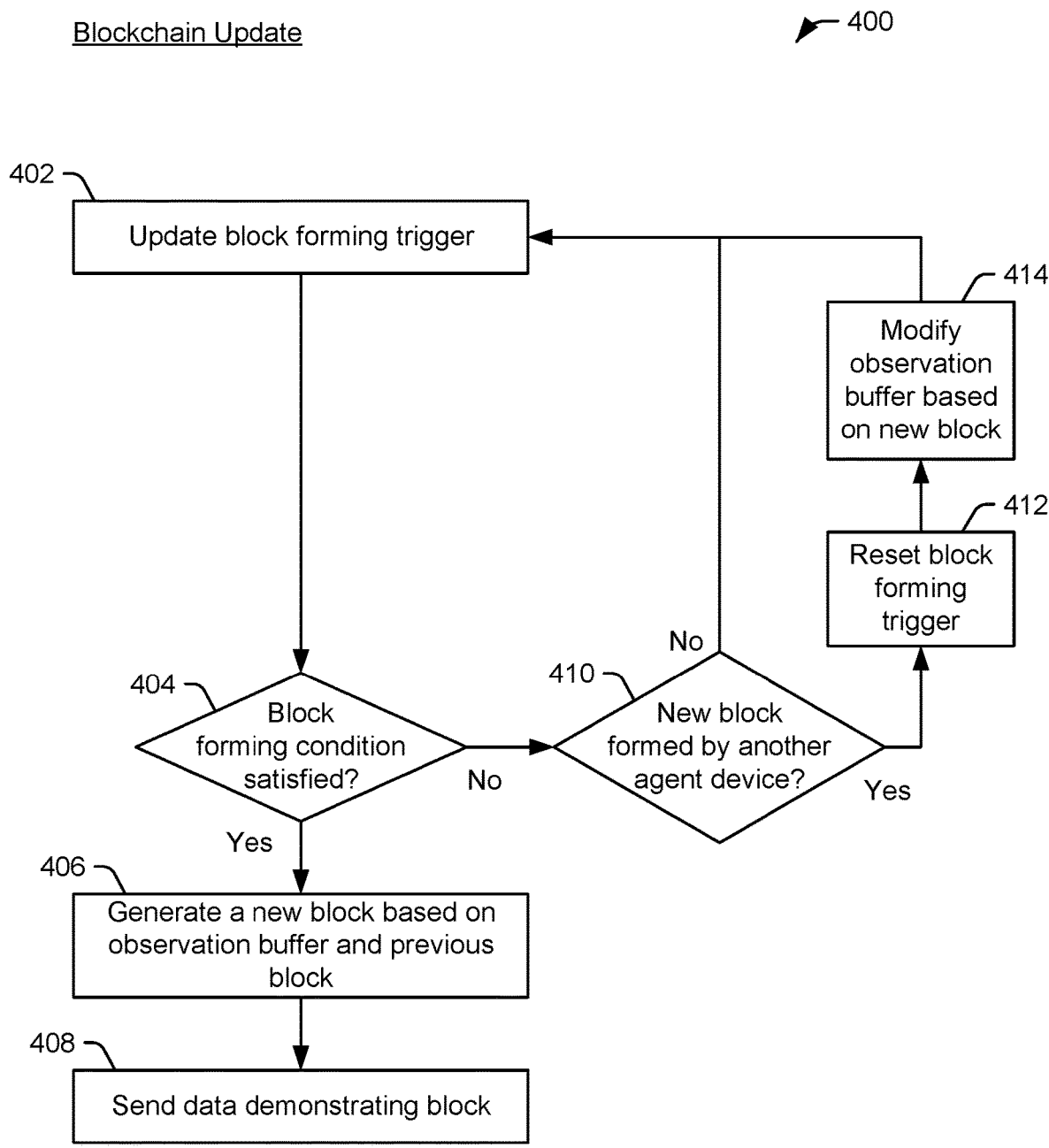
FIG. 4 illustrates a particular example of a method performed by one of the agent devices of FIG. 1 to update a blockchain data structure.

FIG. 4 illustrates a particular example of a method 400 performed by one of the agent devices 102-108 of FIG. 1 to update a blockchain data structure (e.g., the shared blockchain data structure 110, the local instance of the blockchain data structure 150, or both). For example, the method 400 may be performed by the processor 120 of the agent device 102 while executing the blockchain manager instructions 142.

The method 400 includes updating a block forming trigger, at 402, and determining whether the block forming condition is satisfied based on the block forming trigger, at 404. In a particular implementation, the block forming trigger includes a timer, in which case the block forming trigger is updated based on passage of time (e.g., responsive to a clock signal). In such implementations, the block forming condition is satisfied when a threshold period of time has elapsed (as indicated by the block forming trigger) since some event, such as receipt of an observation, confirmation of an observation, addition of a block to the blockchain, or a combination thereof. In other implementations, the block forming trigger includes a counter. In such implementations, the block forming trigger may be updated (e.g., incremented) in response to receipt of an observation report or in response to confirmation of an observation, and the block forming condition is satisfied when the counter reaches a threshold value.

If the block forming condition is satisfied, the method 400 includes, at 406, generating a new block of the blockchain based on one or more observations in the observation buffer and based on a previous block of the blockchain. For example, confirmed observations may be assembled as observation data, such as the observation data of the sample block 118 of FIG. 1. A hash value for the new block is generated based on input values representing the observation data and a hash value of the previous block.

After the new block is generated, the method 400 includes, at 408, sending data demonstrating the new block to other agent devices. The data demonstrating the new block may include the block, or may include information to enable another agent device to recreate the block, such as list identifying observations used to form the block, and the hash value of the new block.

If the block forming condition is not satisfied, the method 400 includes, at 410, determining whether a new block has been formed by another agent device. For example, the block forming condition of another agent device may be satisfied before the block forming condition of the agent device performing the method 400, in which case the other agent device will generate a new block and send data demonstrating the new block. In this circumstance, the agent device performing the method 400 may reset its block forming trigger, at 414. Additionally, since the new block formed by the other agent device may include one or more observations that are in the observation buffer of the agent device performing the method 400, the agent device may modify its observation buffer based on the new block, at 414. For example, each observation of the observation buffer than is included in the new block may be deleted from the observation buffer. The method 400 then returns to 402 to update the block forming trigger based on passage of time or occurrence of an event.

In some implementations, modifying the observation buffer based on the new block, at 414, includes marking one or more observations as included in a block. In such implementations, the observations are retained in the observation buffer or another memory until it is clear that the new block does not conflict with another block. For example, as explained above, block conflicts can occur where two or more agent devices simultaneously or nearly simultaneously generate new block, which may include different observation data. In such cases, the blockchain may include multiple branches, with each branch corresponding to one of the conflicting blocks. Eventually, another new block is added to one of the branches, resulting in one of the branches being longer than the other(s). The longest branch is selected as the main branch, and the other conflicting blocks are rejected from the blockchain. In this situation, the observation data that is in a rejected block and that is not in the blocks that forms the main branch is returned to the observation buffer. Retaining observations in the observation buffer and marking them as included in a block simplifies returning these observations to the observation buffer. For example, the marking can be changed or deleted. In an alternative implementation, observations included in a block are deleted, and the observations are restored to the observation buffer from the block if the block is subsequently removed from the blockchain due to a block conflict.

Figure 5:
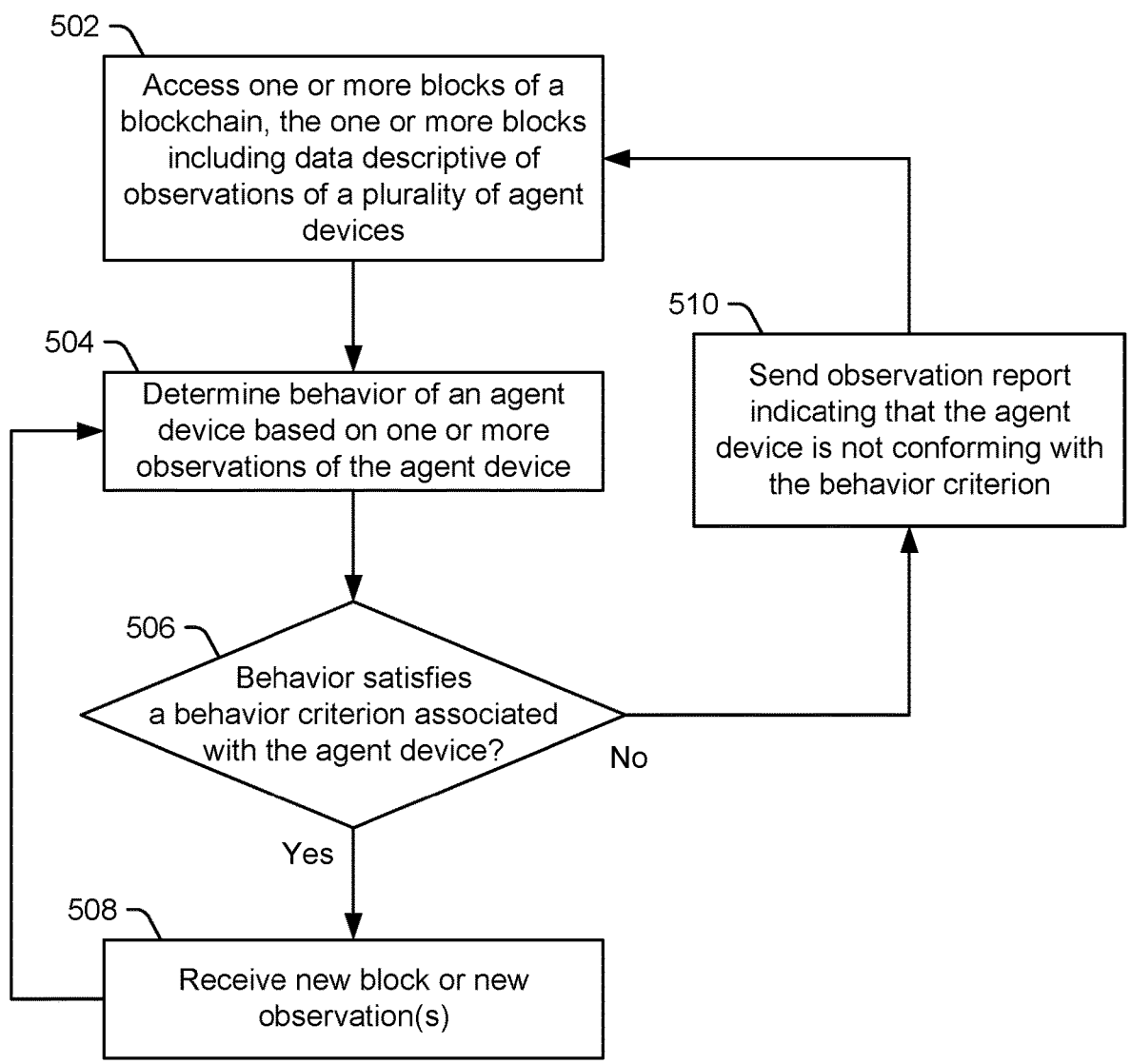
FIG. 5 illustrates a particular example of a method performed by one of the agent devices of FIG. 1 to evaluate behavior of another agent device.

FIG. 5 illustrates a particular example of a method 500 performed by one of the agent devices 102-108 of FIG. 1 to evaluate behavior of another agent device. For example, the method 500 may be performed by the processor 120 of the agent device 102 while executing the behavior evaluation instructions 146. The agent device performing the method 500 may perform the method 500 with respect to each agent device of a self-policing group.

The method 500 includes, at 502, accessing one or more blocks of a blockchain, where the one or more blocks include data descriptive of observations of a plurality of agent devices. For example, the blockchain may be included within or correspond to the shared blockchain data structure 110 or the local instance of the blockchain data structure 150 of FIG. 1. Each of the blocks may include data similar to the block data and observation data of the sample block 118 described with reference to FIG. 1.

The method 500 also includes, at 504, determining a behavior of an agent device based on one or more observations of the agent device. The one or more observations may include confirmed observations from the observation buffer, observations from the one or more blocks of the blockchain, or a combination thereof. In some implementations, the agent devices of a self-policing group may have a different set of confirmed observations in their observation buffers at any particular time (e.g., as a result of message forwarding delays or lost messages). In such implementations, the behavior of the agent device may be determined based solely on observations from the blockchain, since all of the agent devices have access to the same blockchain.

As explained above, the particular behavior or behaviors determined for a particular agent device may depend on behavior criteria associated with each agent device. For example, the method 500 may include determining a behavior corresponding to each behavior criterion specified for each agent device. In some instances, the agent device performing the method 500 may not have access to sufficient confirmed observations to determine a particular behavior for another agent device, in which case the agent device performing the method 500 may assume that the other agent device is conforming to the corresponding behavior criterion.

The method 500 also includes, at 506, determining whether the behavior satisfies a behavior criterion associated with the agent device. If the behavior satisfies the behavior criterion, the method 500 may include, at 508, awaiting receipt of or receiving a new block or a new observation, and returning to 504 to determine (e.g., to determine again) the behavior of the agent device.

If the behavior does not satisfy the behavior criterion, the method 500 includes, at 510, sending an observation report including information indicating that the agent device is not conforming to the behavior criterion. The observation report may be sent in response to determining that behavior does not satisfy the behavior criterion, or the observation report may be sent during a next transmission window allocated for transmission of observation reports by the agent device performing the method 500.

Figure 6:
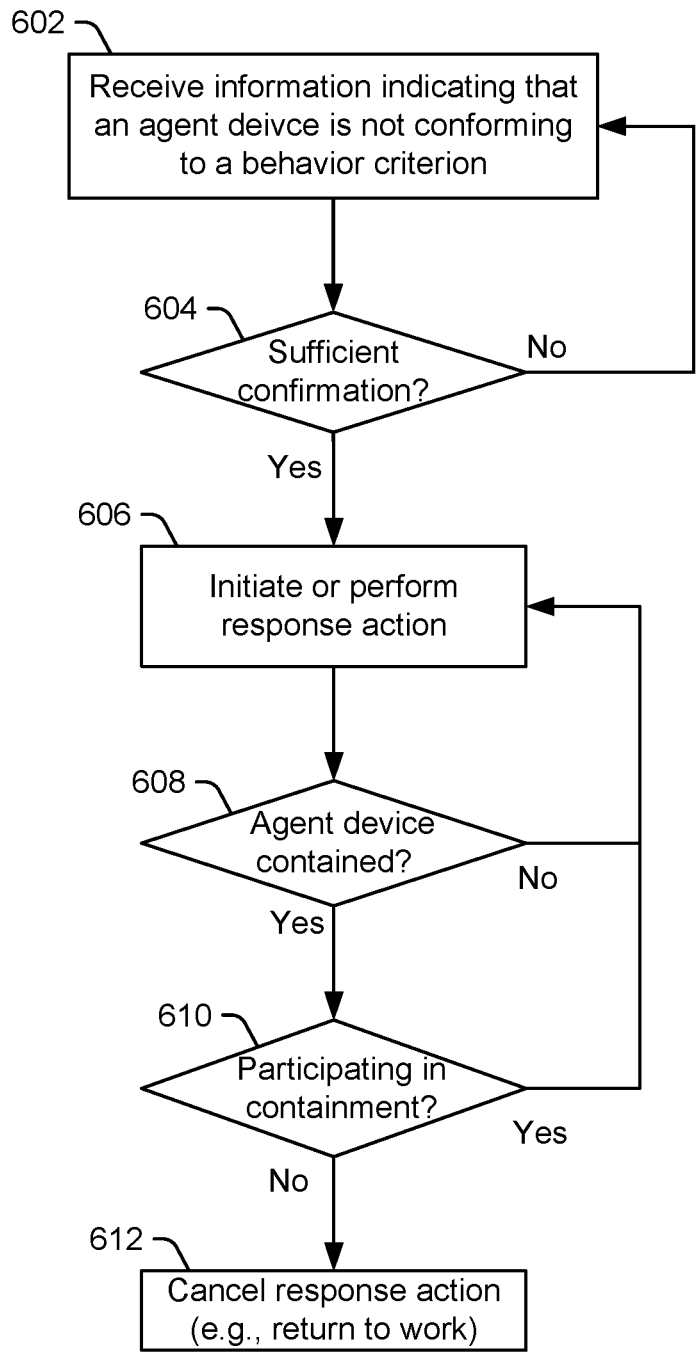
FIG. 6 illustrates a particular example of a method performed by one of the agent devices of FIG. 1 to respond to non-conforming behavior of another agent device.

FIG. 6 illustrates a particular example of a method 600 performed by one of the agent devices 102-108 of FIG. 1 to respond to non-conforming behavior of another agent device. For example, the method 600 may be performed by the processor 120 of the agent device 102 while executing the response instructions 140.

The method 600 includes, at 602, receiving (e.g., at a first agent device) information indicating that an agent device (e.g., a second agent device) is not conforming to a behavior criterion. The information indicating that the second agent device is not conforming to the behavior criterion may be received from the behavior evaluation instructions of the first agent device (e.g., the agent device performing the method 600) or may be received in an observation report from another agent device (e.g., a third agent device).

The method 600 also includes, at 604, determining whether the information indicating that the second agent device is not conforming to the behavior criterion is sufficiently confirmed. For example, the first agent device may maintain a count of a number of observation reports that are received that indicate that the second agent device is not conforming to the behavior criterion, In this example, the information indicating that the second agent device is not conforming to the behavior criterion is considered sufficiently confirmed if more than a threshold number of observation reports are received that indicate that the second agent device is not conforming to the behavior criterion. Alternatively, the information indicating that the second agent device is not conforming to the behavior criterion is considered sufficiently confirmed if, during a threshold time period, more than a threshold number of observation reports are received that indicate that the second agent device is not conforming to the behavior criterion. If information indicating that the second agent device is not conforming to the behavior criterion is not sufficiently confirmed, the method 600 returns to 602 to await arrival of additional information.

If the information indicating that the second agent device is not conforming to the behavior criterion is sufficiently confirmed, the method 600 includes, at 606, initiating or performing a response action. For example, the response action may include moving toward the second agent device (e.g., using the behavior actuators 126) to physically restrain the second agent device or to block movement of the second agent device. As another example, the response action may include sending an override message, such as the override message 188, using an out-of-band transmitter, such as the out-of-band transmitter 132 of FIG. 1.

In some implementations, such as when the second agent device is physically constrained by other agent devices, performing the response action may require continued participation by at least some of the constraining agent devices. In such implementations, some of the constraining agent devices may be able to reach the second agent device more quickly than other agent devices. In such implementations, the method may include, at 608, determining whether the second agent device has been contained, and if not, continuing to perform the response action, at 606 (e.g., continuing to move toward the second agent device).

If the second agent device has been contained, the method 600 includes, at 610, determining whether the agent device performing the method 600 (e.g., the first agent device) is participating in the containment. For example, if other agent devices reach the second agent device and constrain it before the first agent device reaches the second agent device, the first agent device may not participate in containing the second agent device. If the first agent device is participating in containing the second agent device, the first agent device continues to perform the response action (e.g., continues to contain the second agent device). If the first agent device is not participating in containing the second agent device, the first agent device cancels the response action, e.g., by returning to work.

Figure 7:
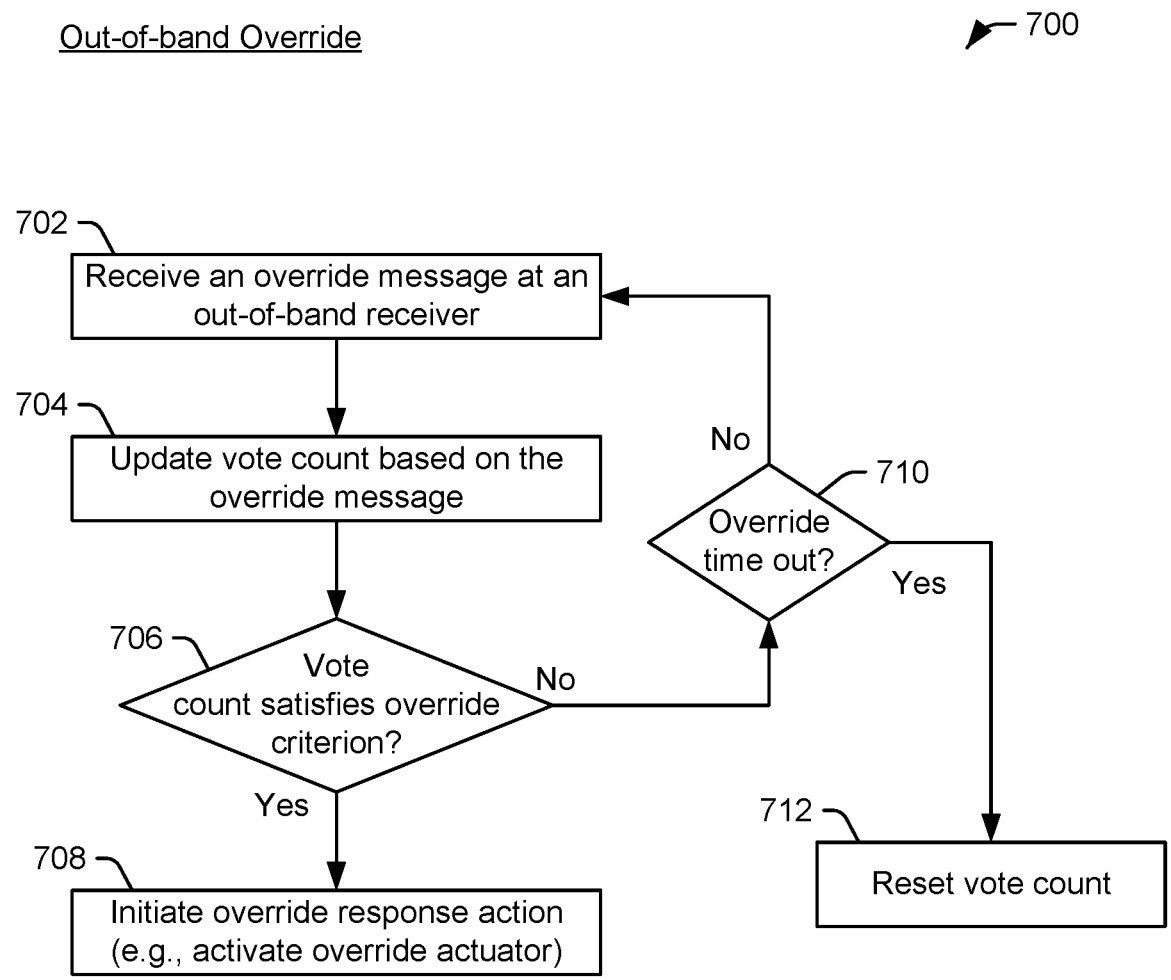
FIG. 7 illustrates a particular example of a method performed by one of the agent devices of FIG. 1 to initiate an override response based on messages from other agent devices.

FIG. 7 illustrates a particular example of a method 700 performed by one of the agent devices 102-108 of FIG. 1 to initiate an override response based on messages from other agent devices. For example, the method 700 may be performed by the override system 160, or a portion thereof, such as by the override processor 164 executing the override instructions 170.

The method 700 includes, at 702, receiving an override message at an out-of-band receiver. For example, the out-of-band receiver 162 of the agent device 102 may receive an override message from another of the agent device 104-108. In a particular implementation, the override message is encrypted using a private key of the agent device that transmitted the override message. In this implementation, the out-of-band receiver or a processor of an override system associated with the out-of-band receiver decrypts the override message using a public key associated with the agent device that transmitted the override message. If decryption using the public key results in generation of a valid override message, a vote count of override messages is updated, at 704. If decryption using the public key does not result in generation of a valid override message, the override message is discarded.

The method 700 also includes, at 706, determining whether the vote count satisfies an override criterion. In some implementations, multiple different override criteria may be used (and compared to the vote count, or to several different vote counts). For example, the vote count may be updated depending on a type of agent device that sent the override message. In this example, votes from different agent devices or different types of agent devices may be weighted differently to determine whether the vote count satisfies the override criterion. To illustrate, an override message from a trusted infrastructure agent device may be weighted more heavily in the vote count (e.g., counted twice in the vote count) than an override message from a peer agent device. As another example, the agent device performing the method 700 may maintain multiple vote counts, and one or more of the vote counts may updated based on the override message. To illustrate, a first vote count may be maintained for override messages that indicate performance of a first override response (e.g., entering a safe condition), and second vote count may be maintained for override messages that indicate performance of a second override response (e.g., damaging or destroying the agent device performing the method 700). In this example, the different vote counts may be compared to respective override criteria.

If the override criterion is satisfied, the method 700 includes, at 708, initiating an override response action, such as activating an override actuator. As described with reference to FIG. 1, activating the override actuator may cause the agent device performing the method 700 to enter a safed condition, to stop, to be temporarily or permanently disabled, to be damaged or destroyed, etc.

In some implementations, if the override criterion is not satisfied, the method 700 includes, at 710, determining whether an override timer has timed out. For example, initiating the override response action may require that a sufficient number and/or type of override messages be received within a threshold time period. If the override timer has timed out, the method 700 includes, at 712, resetting the vote count (or vote counters). If the override timer has not timed out, the method 700 returns to 702 to await receipt of additional override messages.

It is to be understood that the division and ordering of steps of the methods 200-700 of FIGS. 2-7, respectively, is for illustrative purposes only and is not be considered limiting. In alternative implementations, certain steps or certain of the methods may be combined and other steps or methods may be subdivided into multiple steps or methods. Moreover, the ordering of steps within a method may change. For example, resetting a block forming trigger at 412 of FIG. 4 may be performed after the observation buffer is modified at 414. Further, the order of illustration and description of the methods 200-700 is simply to facilitate description and is not limiting. In some implementations, two or more of the methods 200-700 may be performed sequentially (e.g., one after the other). However, in other implementations, two or more of the methods 200-700 may be performed concurrently (e.g., in parallel) with one another.

Together, the methods 200-700 enable multiple agent devices to police one another. An agent device that fails to conform to specified behavior criteria can be constrained by other agent devices. Alternatively, or in addition, control of the agent device that fails to conform to specified behavior criteria can be overridden by other agent devices, resulting in merely safing and stopping the agent device or resulting in damaging or destroying the agent device.

In conjunction with the described aspects, a device (e.g., an autonomous agent device) may include communication circuitry configured to receive a message indicating an observation of an agent device and a processor coupled to the communication circuitry. The device may also include a memory storing instructions that are executable by the processor to cause the processor to perform various operations. The operations include accessing a blockchain data structure. The blockchain data structure includes one or more blocks including data descriptive of observations of a plurality of agent devices, where the plurality of agent devices includes the agent device. The operations also include determining, based on one or more blocks of the blockchain data structure, a behavior of the agent device and determining whether the behavior satisfies a behavior criterion associated with the agent device.

In conjunction with the described aspects, a method includes accessing, by a processor, a blockchain data structure. The blockchain data structure includes one or more blocks including data descriptive of observations of a plurality of agent devices. The method also includes determining, by the processor and based on one or more blocks of the blockchain data structure, a behavior of the agent device of the plurality of agent devices. The method further includes determining, by the processor, whether the behavior satisfies a behavior criterion associated with the agent device. The method also includes initiating, by the processor, a response action based on a determination that the behavior does not satisfy the behavior criterion.

In conjunction with the described aspects, a non-transitory computer readable medium stores instructions that are executable by a processor to cause the processor to perform operations including accessing a blockchain data structure. The blockchain data structure includes one or more blocks including data descriptive of observations of a plurality of agent devices. The operations also include determining, based on one or more blocks of the blockchain data structure, a behavior of the agent device of the plurality of agent devices. The operations further include determining whether the behavior satisfies a behavior criterion associated with the agent device. The operations also include initiating a response action based on a determination that the behavior does not satisfy the behavior criterion.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may take the form of or include a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. An autonomous vehicle participating in a group of self-policing autonomous vehicles comprising:
   a plurality of sensors configured to, while the autonomous vehicle is in transit, generate sensor data indicative of at least the location of at least one second autonomous vehicle participating in the group of self-policing autonomous vehicles;
   communication circuitry configured to:
      send a first message including a first observation report to the group of self-policing autonomous vehicles;
      receive a second message including a second observation report descriptive of at least a location of a third autonomous vehicle participating in the group of self-policing autonomous vehicles;
   a processor coupled to the communication circuitry; and
   a memory storing instructions executable by the processor to cause the processor to:
      generate the first observation report on the at least one second autonomous vehicle based on the sensor data;
      send the first message including the first observation report to the group of self-policing autonomous vehicles;
      in dependence upon detecting a trigger event, record the first observation report in block in a blockchain data structure;
      in response to receiving a non-conforming behavior message concerning the third autonomous vehicle participating in the group of self-policing autonomous vehicles, access the blockchain data structure, the blockchain data structure including one or more blocks including:
         observation data descriptive of observations of the third autonomous vehicle based on sensor data; and
         a behavior criterion associated with the third autonomous vehicle; and
      based on a determination of whether a behavior indicated by the observation data corresponds to the behavior criterion, initiate transmission of a third message, the third message including an indication that the third autonomous vehicle is not conforming to the behavior criterion; and
   a response system coupled to the processor and configured to, based on the determination, initiate transmission of an override message to the third autonomous vehicle.

2. The autonomous vehicle of claim 1, further comprising an actuator configured to enable movement of the autonomous vehicle.

3. The autonomous vehicle of claim 1, wherein the memory includes at least a portion of the blockchain data structure.

4. The autonomous vehicle of claim 1, wherein the instructions are executable by the processor to cause the processor to:
  determine, based on the one or more blocks of the blockchain data structure, a number of other autonomous vehicles in the self-policing group that indicate that the behavior of the third autonomous vehicle does not satisfy the behavior criterion; and
  send a signal to activate the response system based on a determination that the number of other autonomous vehicles in the self-policing group that indicate that the behavior of the third autonomous vehicle does not satisfy the behavior criterion is greater than or equal to a threshold number.

5. The autonomous vehicle of claim 4, wherein the response system includes a transmitter that is distinct from the communication circuitry and is configured to send an override message to the third autonomous vehicle, the override message configured to, in conjunction with override messages from the other autonomous vehicles, bypass a control system of the third autonomous vehicle.

6. The autonomous vehicle of claim 1, wherein the instructions are further executable by the processor to cause the processor to generate a new block of the blockchain data structure based on the message and based on a previous block.

7. The autonomous vehicle of claim 6, wherein the new block is generated based on a determination that a block forming condition is satisfied.

8. The autonomous vehicle of claim 7, wherein the block forming condition is satisfied when a time since formation of the previous block satisfies a second threshold.

9. The autonomous vehicle of claim 1, further comprising an out-of-band override system including an out-of-band receiver distinct from a receiver of the communication circuitry, the out-of-band receiver configured to receive multiple override messages from a plurality of other autonomous vehicles in the self-policing group, and the out-of-band override system configured to destroy at least a portion of the autonomous vehicle responsive to a determination that a number and type of the multiple override messages satisfy an override criterion.

10. The autonomous vehicle of claim 1, further comprising an out-of-band override system including an override processor and an override actuator, the override processor distinct from the processor, the override processor configured to determine whether a first override criteria is satisfied and to cause the override actuator to temporarily disable at least one function of the autonomous vehicle responsive to determining that the first override criteria is satisfied.

11. The autonomous vehicle of claim 10, wherein the override processor is further configured to determine whether a second override criteria is satisfied and to cause the override actuator to permanently disable the at least one function of the autonomous vehicle responsive to determining that the second override criteria is satisfied.

12. The autonomous vehicle of claim 11, wherein the first override criteria is satisfied responsive to receipt of a first set of override messages from the plurality of autonomous vehicles, and wherein the second override criteria is satisfied responsive to receipt of a second set of override messages from the plurality of autonomous vehicles, wherein the first set of override messages includes fewer override messages than the second set of override messages.

13. The autonomous vehicle of claim 11, wherein the first override criteria is satisfied responsive to receipt of override messages from a first set of the plurality of autonomous vehicles, and wherein the second override criteria is satisfied responsive to receipt of override messages from a second set of the plurality of autonomous vehicles, wherein the first set is different from the second set.

14. The autonomous vehicle of claim 11, wherein the first override criteria is satisfied responsive to a count of received override messages of a first type satisfying a first threshold, and wherein the second override criteria is satisfied responsive to a count of received override messages of a second type satisfying a second threshold, wherein the first type is different from the second type.

15. A method of an autonomous vehicle in a group of self-policing autonomous vehicles, the method comprising:
  generate, from a plurality of sensors while the autonomous vehicle is in transit, sensor data indicative of at least the location of at least one second autonomous vehicle participating in the group of self-policing autonomous vehicles;
  generate a first observation report on the at least one second autonomous vehicle based on the sensor data;
  send a first message including the first observation report to the group of self-policing autonomous vehicles;
  in dependence upon detecting a trigger event, record the first observation report in a block in a blockchain data structure;
  in response to receiving a non-conforming behavior message concerning a third autonomous vehicle participating in the group of self-policing autonomous vehicles,
  accessing, by a processor, the blockchain data structure, the blockchain data structure including one or more blocks including:
    observation data descriptive of observations of the third autonomous vehicle based on sensor data; and
    a behavior criterion associated with the third autonomous vehicle; and
  based on a determination of whether a behavior indicated by the observation data corresponds to the behavior criterion:
    initiating transmission of a second message, the second message including an indication that the third autonomous vehicle is not conforming to the behavior criterion; and
    initiating, by the processor, transmission of an override message to the third autonomous vehicle.

16. The method of claim 15, wherein the override message is configured to, in conjunction with override messages from other autonomous vehicles in the self-policing group, bypass a control system of the third autonomous vehicle.

17. The method of claim 16, transmitting, using a first transmitter, the first observation report based on the sensor data, wherein the override message is transmitted using a second transmitter that is distinct from the first transmitter.

18. The method of claim 17, further comprising generating a new block of the blockchain data structure based on the sensor data and based on a previous block.

19. The method of claim 18, wherein the new block is generated based on a determination that a block forming condition is satisfied.

20. The method of claim 19, wherein the block forming condition is satisfied when a count of confirmed observations of autonomous vehicles in the self-policing group satisfies a threshold.

21. The method of claim 15 further comprising:
  determining, by an override processor distinct from the processor, whether a first override criteria is satisfied; and temporarily disabling at least one function of the autonomous vehicle responsive to determining that the first override criteria is satisfied.

22. The method of claim 21 further comprising:
determining, by the override processing, whether a second override criteria is satisfied; and
permanently disabling the at least one function of the autonomous vehicle responsive to determining that the second override criteria is satisfied.

23. The method of claim 22, wherein determining that the first override criteria is satisfied includes receiving a first set of override messages from the plurality of autonomous vehicles, and wherein determining that the second override criteria is satisfied includes receiving a second set of override messages from the plurality of autonomous vehicles, wherein the first set of override messages includes fewer override messages than the second set of override messages.

24. The method of claim 22, wherein determining that the first override criteria is satisfied includes receiving a first set of override messages from a first set of the plurality of autonomous vehicles, and wherein determining that the second override criteria is satisfied includes receiving a second set of override messages from a second set of the plurality of autonomous vehicles, wherein the first set of autonomous vehicles is different from the second set of autonomous vehicles.

25. A non-transitory computer readable medium storing instructions that are executable by a processor to cause the processor to perform operations comprising:
generate, from a plurality of sensors while an autonomous vehicle is in transit, sensor data indicative of at least the location of at least one second autonomous vehicle participating in the group of self-policing autonomous vehicles that includes the autonomous vehicle;
generate a first observation report on the at least one second autonomous vehicle based on the sensor data;
send a first message including the first observation report to the group of self-policing autonomous vehicles;
in dependence upon detecting a trigger event, record the first observation report in block in a blockchain data structure;
in response to receiving a non-conforming behavior message concerning a third autonomous vehicle participating in the group of self-policing autonomous vehicles,
accessing, by a processor, the blockchain data structure, the blockchain data structure including one or more blocks including:
observation data descriptive of observations of the third autonomous vehicle based on sensor data; and
a behavior criterion associated with the third autonomous vehicle; and
based on a determination of whether a behavior indicated by the observation data corresponds to the behavior criterion:
initiating transmission of a second message, the second message including an indication that the third autonomous vehicle is not conforming to the behavior criterion; and
initiating, by the processor, transmission of an override message to the third autonomous vehicle.

26. The non-transitory computer readable medium of claim 25, wherein initiating the response action includes causing an override message to be transmitted to an override system of the agent device, the override message instructing instructs the override system of the agent device third autonomous vehicle to bypass a control system of the agent device third autonomous vehicle.

27. The non-transitory computer readable medium of claim 25, wherein the operations further comprise generating a new block of the blockchain data structure based on the portion of the sensor data and based on a previous block.

28. The non-transitory computer readable medium of claim 27, wherein the operations further comprise transmitting data associated with the new block to one or more other autonomous vehicles.

* * * * *